(12) United States Patent
Tsutsumi (10) Patent No.: US 10,724,704 B2
(45) Date of Patent: Jul. 28, 2020

(54) WATER HEATING DEVICE AND LAMP USING SAME

(71) Applicant: KOITO MANUFACTURING CO., LTD., Tokyo (JP)

(72) Inventor: Yasuaki Tsutsumi, Shizuoka (JP)

(73) Assignee: KOITO MANUFACTURING CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 15/757,411

(22) PCT Filed: Aug. 5, 2016

(86) PCT No.: PCT/JP2016/073168
§ 371 (c)(1),
(2) Date: Mar. 5, 2018

(87) PCT Pub. No.: WO2017/038385
PCT Pub. Date: Mar. 9, 2017

(65) Prior Publication Data
US 2019/0024867 A1    Jan. 24, 2019

(30) Foreign Application Priority Data
Sep. 3, 2015   (JP) ................... 2015-174215

(51) Int. Cl.
*F21S 45/60* (2018.01)
*F21S 43/00* (2018.01)
(Continued)

(52) U.S. Cl.
CPC ............ *F21S 45/60* (2018.01); *B60Q 1/0005* (2013.01); *F21S 41/13* (2018.01); *F21S 41/18* (2018.01);
(Continued)

(58) Field of Classification Search
CPC .. F21S 45/60; F21S 41/13; F21S 41/18; F21S 43/00; F21V 29/90; B60Q 1/0005
(Continued)

(56) References Cited

U.S. PATENT DOCUMENTS 4,368,505 A * 1/1983 Tomforde ............ B60Q 1/0017
239/284.2
5,218,206 A * 6/1993 Schmitt ............... B60R 16/0237
250/339.1
(Continued)

FOREIGN PATENT DOCUMENTS

CN    101156024 A    4/2008
JP    11-273407 A    10/1999
(Continued)

OTHER PUBLICATIONS

International Search Report of PCT/JP2016/073168 dated Nov. 1, 2016.
(Continued)

*Primary Examiner* — Andrew J Coughlin
*Assistant Examiner* — Michael Chiang
(74) *Attorney, Agent, or Firm* — Sughrue Mion, PLLC (57) ABSTRACT

A water heating device (5) includes an infrared light emitting diode (50) configured to emit a light beam in a wavelength band including a wavelength of 1.4 μm or more. With the application of an infrared light beam emitted from the infrared light emitting diode (50) toward an applied body (e.g., a front cover (11)), at least a part of the infrared light beam is absorbed into water attached to the applied body to heat the water.

11 Claims, 4 Drawing Sheets

(51) Int. Cl.
  *F21S 41/14* (2018.01)
  *F21V 29/90* (2015.01)
  *F21S 43/145* (2018.01)
  *F21S 41/13* (2018.01)
  *B60Q 1/00* (2006.01)
  *F21S 41/141* (2018.01)
  *F21S 45/43* (2018.01)
  *F21S 41/20* (2018.01)
  *F21V 23/00* (2015.01)

(52) U.S. Cl.
  CPC ............ *F21S 43/00* (2018.01); *F21S 43/145* (2018.01); *F21V 29/90* (2015.01); *F21S 41/141* (2018.01); *F21S 41/285* (2018.01); *F21S 45/43* (2018.01); *F21V 23/004* (2013.01); *F21V 23/009* (2013.01)

(58) Field of Classification Search
  USPC ......................................................... 219/219
  See application file for complete search history.

(56) References Cited

U.S. PATENT DOCUMENTS

| | | | | |
|---|---|---|---|---|
| 6,165,256 | A * | 12/2000 | Hayakawa | ............ B01J 35/004 106/13 |
| 7,211,771 | B1 * | 5/2007 | Smith | ........................ E01F 9/40 116/202 |
| 2006/0227296 | A1 | 10/2006 | Dobler et al. | |
| 2008/0265789 | A1 * | 10/2008 | Bertram | ................... F21K 9/23 315/185 R |
| 2009/0196060 | A1 * | 8/2009 | Sazuka | .................... B60Q 1/14 362/509 |
| 2013/0182429 | A1 * | 7/2013 | Belliveau | .................. F21V 5/04 362/235 |
| 2013/0249375 | A1 * | 9/2013 | Panagotacos | ...... H05B 33/0803 313/13 |
| 2014/0152471 | A1 * | 6/2014 | Suzuki | .................... F21V 29/90 340/928 |
| 2015/0120093 | A1 * | 4/2015 | Renno | ................. G01N 21/3554 701/3 |
| 2015/0211928 | A1 * | 7/2015 | Itoh | ....................... G01N 21/359 356/369 |
| 2015/0375672 | A1 * | 12/2015 | Takahashi | ............ G02B 6/0068 701/49 |
| 2017/0311385 | A1 * | 10/2017 | Gasworth | ............ H05B 3/0033 |

FOREIGN PATENT DOCUMENTS

| | | |
|---|---|---|
| JP | 2007-141761 A | 6/2007 |
| JP | 2010-097829 A | 4/2010 |
| JP | 2013-109917 A | 6/2013 |
| JP | 2013-139691 A | 7/2013 |

OTHER PUBLICATIONS

Communication dated Apr. 21, 2020, from the Japanese Patent Office in application No. 2017-537692.

Communication dated Apr. 17, 2020 issue by the China National Intellectual Property Administration in application No. 201680050943.2.

* cited by examiner

| STATE OF FRONT COVER | DRY | FOGGED | WET | SNOW ATTACHED |
|---|---|---|---|---|
| LIGHT RECEIVING QUANTITY OF FIRST LIGHT RECEIVING DEVICE | EXTREMELY LOW | LOW | EXTREMELY LOW | MODERATE |
| LIGHT RECEIVING QUANTITY OF SECOND LIGHT RECEIVING DEVICE | EXTREMELY LOW | MODERATE | LOWER MODERATE | HIGH |
| INTENSITY OF LIGHT BEAM EMITTED FROM INFRARED LIGHT EMITTING DIODE | ZERO | LOW | MODERATE | HIGH |

| STATE OF FRONT COVER | DRY | FOGGED | WET | SNOW ATTACHED |
|---|---|---|---|---|
| LIGHT RECEIVING QUANTITY OF FIRST LIGHT RECEIVING DEVICE | HIGH | LOW | LOW | EXTREMELY LOW |
| LIGHT RECEIVING QUANTITY OF SECOND LIGHT RECEIVING DEVICE | HIGH | MODERATE | HIGH | EXTREMELY LOW |
| INTENSITY OF LIGHT BEAM EMITTED FROM INFRARED LIGHT EMITTING DIODE | ZERO | LOW | MODERATE | HIGH |

WATER HEATING DEVICE AND LAMP USING SAME

CROSS REFERENCE TO RELATED APPLICATIONS

This application is a National Stage of International Application No. PCT/JP2016/073168 filed Aug. 5, 2016, claiming priority based on Japanese Patent Application No. 2015-174215 filed Sep. 3, 2015.

TECHNICAL FIELD

The present invention relates to a water heating device and a lamp using the same.

BACKGROUND ART

Snow is sometimes attached to light-transmitting bodies, such as windowpanes and vehicle headlight covers, which are in contact with the outside. There are concerns that snow attached to a windowpane reduces the visibility of things through the windowpane, and snow attached to the cover of a headlight decreases light distribution. Thus, there are demands for melting snow having been attached to these light-transmitting bodies.

Patent Literature 1 describes a vehicle lamp that can melt snow attached to its front lens, which is a light-transmitting body. This vehicle lamp includes an auxiliary light source that applies infrared light components. The application of light beams emitted from this auxiliary light source to the front lens heats the front lens. A temperature rise in the front lens causes the snow having been attached to the front lens to melt.

[Patent Literature 1] JP2007-141761 A

SUMMARY OF INVENTION

However, the vehicle lamp described in Patent Literature 1 has concern that the heat of the heated lens is not entirely conducted to the snow and a part of the heat is released to the atmosphere or the heat is not efficiently conducted to the snow because a part of the heat is conducted to a lens holder, for example. Therefore, this vehicle lamp is susceptible to improvement for more efficiently melting snow.

There is also concern that visibility or light distribution is reduced also in the case in which the attachment of water to light-transmitting bodies, such as windowpanes and vehicle headlight covers, causes fogging. This also brings about demands for removing water attached to light-transmitting bodies. Therefore, there are demands for melting snow having been attached to the lens like the vehicle lamp described in Patent Literature 1 as well as there are demands for heating attached water in order to remove the water. Also in this case, water is preferably efficiently heated. There are also demands for the application of heating water like this to the removal of water attached to things other than vehicle lamps.

Therefore, it is an object of the present invention to provide a water heating device that enables efficient heating of water attached to things and a lamp using the same.

To achieve the object, a water heating device of the present invention includes: an infrared light emitting diode configured to emit an infrared light beam in a wavelength band including a wavelength of 1.4 μm or more, wherein with application of the infrared light beam toward an applied body, at least a part of the infrared light beam is absorbed into water attached to the applied body to heat the water.

In infrared light beams, a light beam having a wavelength of 1.4 μm or more has a high absorptivity into water regardless of the states of water, such as liquid and solid states. Conversely, even infrared light beams having a wavelength of less than 1.4 μm have an extremely low absorptivity into water. Thus, the absorption of such infrared light beams by water enables the direct heating of water by the energy of light beams. Since water is directly heated as described above, water can be efficiently heated, compared with the case in which water attached to a lens, for example, is heated by thermal conduction from the lens by heating the lens to which water is attached as in the previously existing technique. Note that, in the case in which water in a liquid state is attached to an applied body, at least a part of the water can be evaporated. In the case in which water attached to the applied body is a solid, such as snow and frost, for example, can be melted.

Furthermore, it is preferable that the applied body transmits the infrared light beam.

The transmission of the infrared light beam emitted from the infrared light emitting diode through the applied body enables the absorption of the light beam into water through the applied body, and enables the heating of water, even in the case in which water attached to the applied body is located opposed to the side where the infrared light emitting diode is located.

Alternatively, it is preferable that the applied body reflects off the infrared light beam.

In this case, in the case in which with the application of the infrared light beam from the side, where water is attached, toward the applied body, a part of the infrared light beam applied from the infrared light emitting diode to the applied body is transmitted through the water, the transmitted infrared light beam is reflected off the applied body. Since the reflected infrared light beam is again passed through the water, the infrared light beam emitted from the infrared light emitting diode is absorbed into the water before and after reflected off the applied body. Thus, more efficient absorption of the light beam into water is enabled.

Furthermore, it is preferable that the water heating device further includes: a first reference light emitting diode configured to emit a first reference light beam in a wavelength band including a wavelength of 1.4 μm or more; a first light receiving device configured to receive the first reference light beam; a second reference light emitting diode configured to emit a second reference light beam in a wavelength band having an absorptivity into water lower than an absorptivity of the first reference light beam into water; a second light receiving device configured to receive the second reference light beam; and a controller, wherein the controller adjusts an intensity of the infrared light beam emitted from the infrared light emitting diode based on an output of the first light receiving device and an output of the second light receiving device.

As described above, the light beam having a wavelength of 1.4 μm or more has a high absorptivity into water. Therefore, the infrared light emitting diode can emit an infrared light beam having an appropriate intensity by emitting the first reference light beam having a high absorptivity into water and the second reference light beam having an absorptivity into water lower than the absorptivity of the first reference light beam into water, comparing the light receiving quantities of these emitted light beams with each other, and adjusting the intensity of an infrared light beam for heating water emitted from the infrared light emitting diode. Thus, more efficient heating of water is enabled.

Furthermore, it is preferable that the applied body transmits the infrared light beam, the first reference light beam, and the second reference light beam, the first light receiving device receives the first reference light beam transmitted through the applied body, and the second light receiving device receives the second reference light beam transmitted through the applied body.

In this case, in the case in which the water attached to the applied body is located opposed to the side where the infrared light emitting diode is located, the infrared light emitting diode can emit an infrared light beam having an appropriate intensity in the absorption of the light beam into water through the applied body.

Furthermore, it is preferable that the applied body reflects off the infrared light beam, the first reference light beam, and the second reference light beam, the first light receiving device receives the first reference light beam reflected off the applied body, and the second light receiving device receives the second reference light beam reflected off the applied body.

In this case, the infrared light beam from the infrared light emitting diode, the first reference light beam, and the second reference light beam are applied from the side, where water is attached, toward the applied body. Since the first reference light beam is also absorbed into moisture in air, water attached to the applied body as well as the humidity of the space on the side where water is attached to the applied body can be detected using the first and the second reference light beams. Thus, the intensity of the infrared light beam emitted from the infrared light emitting diode can be adjusted suitable for the humidity. For example, an infrared light beam having a higher intensity can be emitted from the infrared light emitting diode as humidity is higher.

Furthermore, it is preferable that the infrared light beam is applied to a lower area below a center of the applied body.

In the case in which water in air is attached to the applied body or in the case in which snow is attached to the applied body, water tends to be attached to the lower area of the applied body. Thus, as described above, the application of the infrared light beam to the lower area of the applied body enables efficient heating of water.

Furthermore, it is preferable that the applied body includes a main body and a surface layer, and the surface layer is more hydrophilic than the main body.

With the hydrophilic surface of the applied body, when water attached to the applied body is liquid, the water easily spreads over the surface of the applied body. Thus, the water can absorb the infrared light beam from the infrared light emitting diode in a wider area.

Consequently, the hydrophilic surface of the applied body enables more efficient heating of water. As described above, the spreading of attached water over the surface of the applied body enables a reduction in the thickness of water, and this enables the evaporation of water for shorter time.

Furthermore, a lamp of the present invention includes: a light source configured to emit a visible light beam; a cover configured to transmit the visible light beam emitted from the light source; and the water heating device according to any of the above, wherein the applied body is the cover.

In accordance with such a lamp, the water heating device enables efficient heating of water attached to the cover. Thus, when water is liquid, the amount of the attached water can be efficiently reduced, whereas when water is snow, the snow can be efficiently melted.

Furthermore, it is preferable that a spray unit configured to spray water to an outgoing surface of the cover to emit the visible light beam is included.

In this case, the outgoing surface of the visible light beam can be cleaned, or the attached snow can be removed. Even in the case in which the sprayed water is attached to the cover, the water heating device enables efficient heating of water attached to the cover.

Furthermore, the lamp may be a vehicle lamp configured to apply the visible light beam toward an outside of a vehicle. In this case, fog can be prevented from generating and snow can be melted on the vehicle lamp, such as the headlight, and thus the light can be appropriately distributed.

Furthermore, when the lamp is a vehicle lamp, it is preferable that the infrared light beam has a wavelength band including a wavelength of 2.5 µm or more and 3.5 µm or less.

In vehicle lamps, such as headlights, in the case in which water attached to the cover that is an applied body is liquid, the film thickness of the water is approximately 10 µm to 1 mm. In this case, the absorptivity of the light beam into water is higher at a wavelength of 2.5 µm or more and 3.5 µm or less than that at the other wavelengths. Thus, as described above, the infrared light beam emitted from the infrared light emitting diode has a wavelength band including a wavelength of 2.5 µm or more and 3.5 µm or less, and this enables more effective heating of water attached to the cover.

As described above, according to the present invention, a water heating device that enables efficient heating of water attached to things and a lamp using the same can be provided.

DESCRIPTION OF EMBODIMENTS

In the following, preferred embodiments of a water heating device according to the present invention and a lamp using the same will be described in detail with reference to the drawings.

First Embodiment

Figure 1:
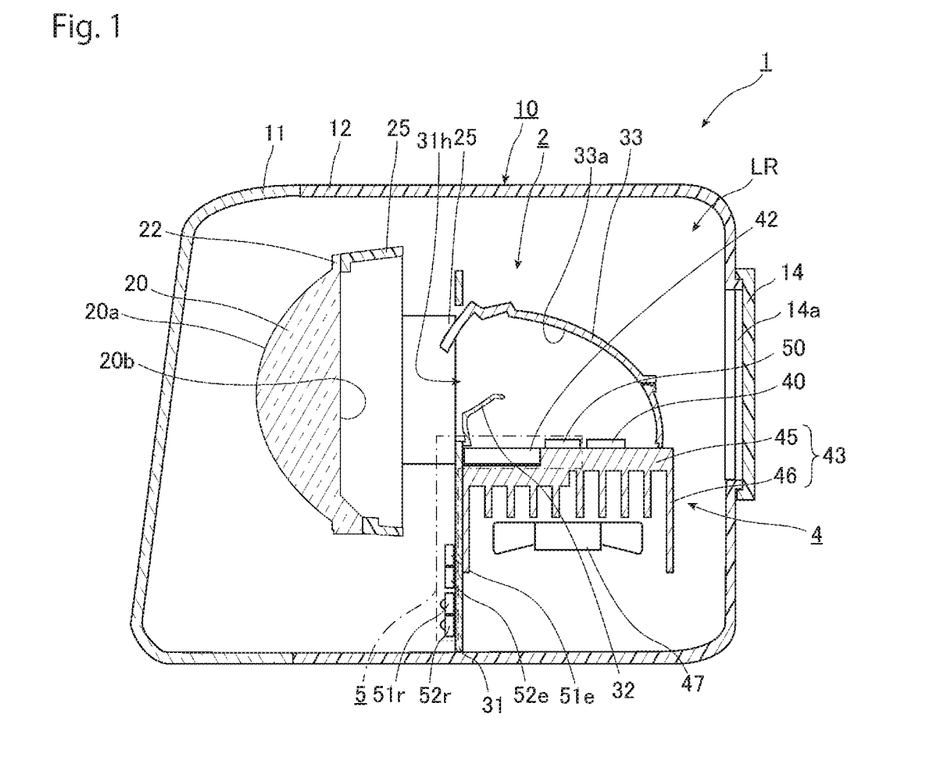
FIG. 1 is a schematic cross sectional view of a lamp according to a first embodiment of the present invention.

FIG. 1 is a schematic cross sectional view of a lamp according to an embodiment. As illustrated in FIG. 1, a lamp 1 according to the embodiment is a vehicle headlight. The lamp 1 includes a lamp unit 2, a case 10, and a water heating device 5.

<Case 10>

The case 10 is formed of a front cover 11, a lamp housing 12, and a back cover 14. The space in the case is a lamp chamber LR. The lamp unit 2 and the water heating device 5 are accommodated in the lamp chamber LR.

The front side of the lamp housing 12 has an opening. The front cover 11 is fixed to the lamp housing 12 to block the opening. The front cover 11 is configured of a material that transmits visible light beams. On the rear side of the lamp housing 12, an opening 14a smaller than the front side opening is formed. The back cover 14 is mounted on the lamp housing 12 to block this opening 14a.

Figure 2:
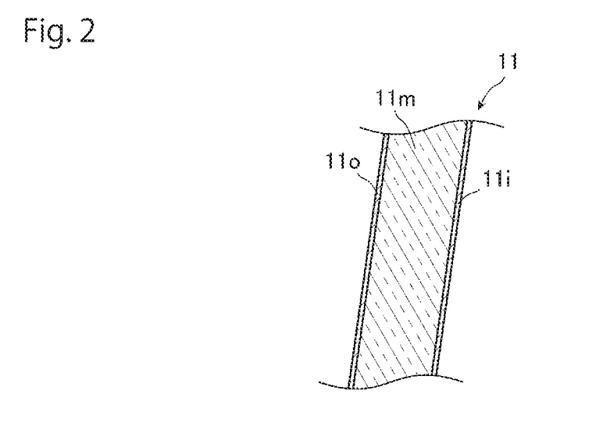
FIG. 2 is an enlarged view of a front cover illustrated in FIG. 1.

FIG. 2 is an enlarged view of the front cover 11. As illustrated in FIG. 2, the front cover 11 of the embodiment is formed of a front cover main body 11m, an inner surface layer 11i, and an outer surface layer 11o. The front cover main body 11m is formed of, for example, a material that has a high strength and transmits visible light beams, including glass and polycarbonates. The inner surface layer 11i is a layer formed on the lamp chamber LR side surface of the front cover main body 11m. The outer surface layer 11O is a layer formed on the outer surface of the front cover main body 11m. The inner surface layer 11i and the outer surface layer 11O are more hydrophilic than the front cover main body 11m is. Therefore, the inner surface layer 11i and the outer surface layer 11O have water contact angles smaller than the water contact angle of the front cover main body 11m. Thus, the attached water more often tends to spread in the case in which water is attached to the inner surface layer 11i or the outer surface layer 11O than in the case in which water is attached to the front cover main body 11m with no provision of the inner surface layer 11i or the outer surface layer 11o. Examples of the inner surface layer 11i and the outer surface layer 11O can include a titanium oxide layer, a silica-based layer, a flame treated layer, and a plasma treated layer.

<Lamp Unit 2>

As illustrated in FIG. 1, the lamp unit 2 includes a light source unit 4, a reflector 33, a projection lens 20, a lens holder 25, a base plate 31, and a shade 32 as main components.

The light source unit 4 includes a visible light emitting diode 40, a light emission controller 42, a heat sink 43, and a cooling fan 47 as main components. In the lamp 1 according to the embodiment, the visible light emitting diode 40 is a semiconductor light emitting diode, and emits light beams having wavelengths approximately in the range of 380 nm to 780 nm. Examples of semiconductor light emitting diodes can include a light emitting diode (LED), a laser diode (LD), and an organic light emitting diode (OLED). The light emission controller 42 controls the light emission of the visible light emitting diode 40. Note that, the visible light emitting diode 40 may be a light emitting diode other than semiconductor light emitting diodes. However, from the viewpoint of a reduction in power consumption and a reduction in heat generation, the visible light emitting diode 40 is preferably a semiconductor light emitting diode as described above.

The heat sink 43 has a base 45 and a plurality of heat dissipating fins 46. The base 45 is a plate-shaped member. On one face of the base 45, the visible light emitting diode 40 and the light emission controller 42 are placed through a circuit board, not shown. On the other face of the base 45, the heat dissipating fins 46 are integrally provided with the base 45. On the side where the heat dissipating fins 46 of the heat sink 43 are provided, the cooling fan 47 is mounted. Heat emitted from the visible light emitting diode 40 and the light emission controller 42 is conducted from the base 45 to the heat dissipating fins 46, and the heat dissipating fins 46 are cooled by the cooling fan 47 to efficiently release heat from the light source unit 4.

The reflector 33 is formed of a curved plate member. The reflector 33 is fixed to the light source unit 4, covering the visible light emitting diode 40. The face opposed to the visible light emitting diode 40 is a reflection plane 33a. Specifically, the reflection plane 33a is based on a spheroidal face. The elliptic surface has a first focal point and a second focal point, and the visible light emitting diode 40 is placed at a position of the first focal point or a location near the first focal point. At least a part of the light beam emitted from the visible light emitting diode 40 is reflected off the reflection plane 33a to the projection lens 20 side.

The projection lens 20 is an aspherical planoconvex lens, including an incidence plane 20b and an outgoing surface 20a. The incidence plane 20b is a face to which a light beam from the visible light emitting diode 40 is entered. The incidence plane 20b is a flat surface. The outgoing surface 20a is a face from which the light beam is emitted. The outgoing surface 20a is a convex surface bulging in the emission direction of the light beam. On the rim of the projection lens 20, a flange 22 is formed. The projection lens 20 is placed in such a manner that its back focal point is located at or near the second focal point of the reflection plane 33a of the reflector 33. That is, the lamp unit 2 of the embodiment is a projector ellipsoid system (PES) optical system.

The lens holder 25 is a member configured to hold the projection lens 20. The projection lens 20 is fixed to the lens holder 25 by welding the flange 22 to one end of the lens holder 25. The end portion of the lens holder 25 on the opposite side of the projection lens 20 is fixed to the light source unit 4 by screwing, for example.

The base plate 31 is a metal plate-shaped member. The base plate 31 is fixed to the light source unit 4 by screwing, for example, between the lens holder 25 and the light source unit 4. That is, the lens holder 25 is fixed to the light source unit 4 through the base plate 31. The base plate 31 is located on the opposite side of the lens holder 25 where the projection lens 20 is fixed.

The base plate 31 is formed with an opening 31h through which light beam emitted from the visible light emitting diode 40 and reflected off the reflector 33 is passed. The light beam emitted from the visible light emitting diode 40 is passed through the opening 31h, and entered to the projection lens 20.

The base plate 31 is fixed to the lamp housing 12 through a mounting unit, not shown. The fixing of the base plate 31 to the lamp housing 12 fixes the lamp unit 2 to the lamp housing 12.

The shade 32 is a member that blocks a part of the light beam from the visible light emitting diode 40. The shade 32 is fixed to the surface of the base plate 31 on the opposite side of the projection lens 20. The light beam emitted from the visible light emitting diode 40 is reflected off the reflector 33, and a part of the light beam is applied to the shade 32. A part of the light beam applied to the shade 32 is blocked by the shade 32, and is not entered to the projection lens 20. The other part of the light beam is reflected off the shade 32, and entered to the projection lens 20. In this manner, the shade 32 controls the light beam from the visible light emitting diode 40 to be entered to the projection lens 20. Thus, the light beam emitted from the projection lens 20 has a desired light distribution pattern.

As described above, the projection lens 20 is fixed to the lens holder 25. The shade 32 is fixed to the base plate 31. The lens holder 25 and the base plate 31 are fixed to the light source unit 4. Thus, the relative position between the projection lens 20 and the shade 32 is accurately determined. Since the reflector 33 is also fixed to the light source unit 4, the relative positions between the visible light emitting diode 40, the reflector 33, the shade 32, and the projection lens 20 are also accurately determined. Consequently, the optical path of the light beam that is emitted from the visible light emitting diode 40, applied to the shade 32, and then entered to the projection lens 20 can be accurately predicted. Note that, in the embodiment, an example is shown in which the shade 32 is fixed. However, for example, the shade 32 may be movable. In this case, the motion of the shade 32 enables the light distribution pattern to be changed.

<Water Heating Device 5>

The water heating device 5 placed in the lamp chamber LR includes an infrared light emitting diode 50, a first reference light emitting diode 51e, a second reference light emitting diode 52e, a first light receiving device 51r, a second light receiving device 52r, and the light emission controller 42. As described above, since the light emission controller 42 is also a part of the light source unit 4, the light emission controller 42 is a part of the light source unit 4 as well as a part of the water heating device 5.

The infrared light emitting diode 50 is a light emitting diode that emits an infrared light beam. Specifically, the infrared light emitting diode 50 emits an infrared light beam in a wavelength band including a wavelength of 1.4 µm or more. Note that, the value of this wavelength is a value that the value at the second decimal place is rounded off. The light beam having a wavelength of 1.4 µm or more has a high absorptivity into water regardless of the states of water, such as liquid and solid states. In the case in which the lamp 1 is a vehicle lamp that applies visible light beams toward the outside of the vehicle as in the embodiment, when water attached to the front cover 11 is liquid, the film thickness of the water is approximately 10 µm to 1 mm. In this case, the absorptivity of the light beam into water is specifically higher at a wavelength of 2.5 µm or more and 3.5 µm or less than in other wavelength ranges. Thus, when the infrared light beam emitted from the infrared light emitting diode 50 has a wavelength band including a wavelength of 2.5 µm or more and 3.5 µm or less, the infrared light beam is efficiently absorbed into water having a film thickness of approximately 10 µm to 1 mm, which is more preferable. Note that, the light beam emitted from the infrared light emitting diode 50 may have a wavelength band including a wavelength of 1.9 µm or more and 2.0 µm or less, although its absorptivity into water is not so high as the light beam having a wavelength of 2.5 µm or more and 3.5 µm or less. A light beam having a wavelength band including a wavelength of 1.4 µm or more and 1.6 µm or less may be emitted from the infrared light emitting diode 50, although its absorptivity into water is lower than the absorptivity of the light beam having a wavelength band including a wavelength of 1.9 µm or more and 2.0 µm or less. Note that, the infrared light emitting diode 50 may emit light beam in the other wavelength bands as long as the infrared light emitting diode 50 emits an infrared light beam in a wavelength band including a wavelength of 1.4 µm or more. However, from the viewpoint of efficiently heating water, preferably, the infrared light emitting diode 50 emits only an infrared light beam in the wavelength band of 1.4 µm or more. From the similar viewpoint, in the case in which the lamp 1 is a vehicle lamp that applies visible light beams toward the outside of the vehicle, more preferably, the infrared light emitting diode 50 emits only an infrared light beam in the wavelength band of 2.5 µm or more and 3.5 µm or less. The infrared light emitting diode 50 of the embodiment is formed of a semiconductor light emitting diode. Since the infrared light emitting diode 50 is formed of a semiconductor light emitting diode, a reduction in power consumption is expected, compared with the case in which the infrared light emitting diode 50 is configured of a tungsten-halogen lamp, for example. However, the infrared light emitting diode 50 of the embodiment does not necessarily have to be configured of a semiconductor light emitting diode. Note that, examples of semiconductor light emitting diodes configuring the infrared light emitting diode 50 include semiconductor light emitting diodes that are similar types of semiconductor light emitting diodes configuring the visible light emitting diode 40. In the embodiment, the infrared light emitting diode 50 is placed on the top face of the base 45 through the circuit board, not shown, arranged side by side with the visible light emitting diode 40. Thus, the light beam emitted from the infrared light emitting diode 50 propagates through approximately the same optical path as the optical path of the light beam emitted from the visible light emitting diode 40. Note that, FIG. 1 shows an example in which one infrared light emitting diode 50 is provided. However, the infrared light emitting diode 50 may be formed of a plurality of semiconductor light emitting diodes.

The first reference light emitting diode 51e is a light emitting diode that emits an infrared light beam. Specifically, the first reference light emitting diode 51e emits an infrared light beam in a wavelength band including a wavelength of 1.4 µm or more as a first reference light beam. In the case in which the lamp 1 is a vehicle lamp that applies visible light beams toward the outside of the vehicle as in the embodiment, from the viewpoint of improving the absorptivity into water in a film thickness of 10 µm to 1 mm, the first reference light beam preferably has a wavelength band including a wavelength of 2.5 µm or more and 3.5 µm or less, may have a wavelength band including a wavelength of 1.9 µm or more and 2.0 µm or less, or may have a wavelength band including a wavelength of 1.4 µm or more and 1.6 µm or less. Note that, the effective value of the wavelength of the light beam emitted from the first reference light emitting diode 51e is similar to the effective value of the wavelength of the infrared light beam emitted from the infrared light emitting diode 50. In the embodiment, the first reference light emitting diode 51e emits an infrared light beam having intensity lower than the intensity of the infrared light beam emitted from the infrared light emitting diode 50. The wavelength of the light beam emitted from the first reference light emitting diode 51e may be equal to or different from the wavelength of the light beam emitted from the infrared light emitting diode 50, as described later.

The first light receiving device 51r is a light receiving device that receives the first reference light beam emitted from the first reference light emitting diode 51e. The first light receiving device 51r is formed of a photodiode, for example, and outputs a signal having strength corresponding to the intensity of the received light beam. The peak of the light receiving sensitivity of the first light receiving device 51r is approximately comparable with the center wavelength of the first reference light beam emitted from the first reference light emitting diode 51e. The first light receiving device 51r is connected to the light emission controller 42. The signal outputted from the first light receiving device 51r is inputted to the light emission controller 42.

The second reference light emitting diode 52e is a light emitting diode that emits a light beam having a wavelength different from the wavelength of the light beam emitted from the first reference light emitting diode 51e as a second reference light beam. The wavelength of the light beam emitted from the second reference light emitting diode 52e is a wavelength having an absorptivity into water lower than that of the wavelength of the first reference light beam emitted from the first reference light emitting diode 51e. Note that, the light beam emitted from the second reference light emitting diode 52e is preferably an infrared light beam having a wavelength different from the wavelength of the infrared light beam emitted from the first reference light emitting diode 51e, because of the viewpoint of being visually unrecognizable by a person. For example, in the case in which the first reference light emitting diode 51e emits an infrared light beam having a wavelength of 2.9 μm, the second reference light emitting diode 52e emits an infrared light beam having a wavelength of 0.84 μm.

The second light receiving device 52r is a light receiving device that receives the second reference light beam emitted from the second reference light emitting diode 52e. The second light receiving device 52r is formed of a photodiode, for example, and outputs a signal having strength corresponding to the intensity of the received light beam. The peak of the light receiving sensitivity of the second light receiving device 52r is approximately comparable with the center wavelength of the second reference light beam emitted from the second reference light emitting diode 52e. The second light receiving device 52r is connected to the light emission controller 42. The signal outputted from the second light receiving device 52r is inputted to the light emission controller 42.

In the embodiment, the front cover 11 is configured to transmit visible light beams emitted from the visible light emitting diode 40 as well as infrared light beams emitted from the infrared light emitting diode 50 as described above. The front cover 11 is configured to transmit most of the first reference light beam emitted from the first reference light emitting diode 51e and the second reference light beam emitted from the second reference light emitting diode 52e and to reflect a part of the first and the second reference light beams. However, the light quantities of the first and the second reference light beams reflected off the front cover 11 may be small quantities. The front cover 11 reflects off the first and the second reference light beams to a degree of the Fresnel reflection of a typical light-transmitting body.

Note that, in the case in which the wavelength of the light beam emitted from the first reference light emitting diode 51e is equal to the wavelength of the light beam emitted from the infrared light emitting diode 50, this is preferable because the transmission property of the front cover 11 is easily controlled, compared with the case in which the wavelengths of the light beams are different from each other. On the other hand, in the case in which the wavelength of the light beam emitted from the first reference light emitting diode 51e is different from the wavelength of the light beam emitted from the infrared light emitting diode 50, this is preferable because the first light receiving device 51r that receives the first reference light beam from the first reference light emitting diode 51e is not easily affected by the light beam from the infrared light emitting diode 50.

Note that, in the embodiment, the first and the second reference light emitting diodes 51e and 52e and the first and the second light receiving devices 51r and 52r are placed on the base plate 31 through a circuit board, not shown. However, these diodes and devices may be placed in the lamp chamber LR using other mounting mechanisms, not limited to this example. Note that, the first light receiving device 51r is fixed to the position to receive the light beam emitted from the first reference light emitting diode 51e, and the second light receiving device 52r is fixed to the position to receive the light beam emitted from the second reference light emitting diode 52e. In the embodiment, the first light receiving device 51r receives the light beam reflected off the front cover 11 in the light beam emitted from the first reference light emitting diode 51e. The second light receiving device 52r receives the light beam reflected off the front cover 11 in the light beam emitted from the second reference light emitting diode 52e. Thus, the outgoing surface of the first light receiving device 51r, the light receiving surface of the first light receiving device 51r, the outgoing surface of the second reference light emitting diode 52e, and the light receiving surface of the second light receiving device 52r are directed to the front cover 11 side.

Figure 3:
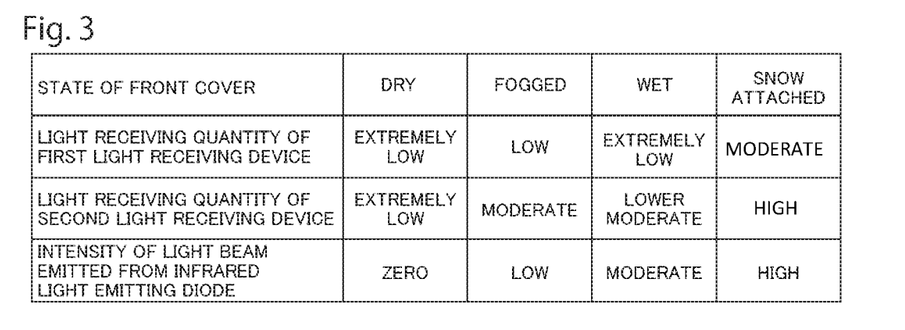
FIG. 3 is a schematic view of information stored on a memory in a light emission controller.

In addition to the control of the light emission of the visible light emitting diode 40, the light emission controller 42 controls the light emission of the infrared light emitting diode 50 and the first and the second reference light emitting diodes 51e and 52e. The light emission controller 42 has a memory, not shown. The memory stores the relationship between the intensity of the first reference light beam received by the first light receiving device 51r and the intensity of the second reference light beam received by the second light receiving device 52r, and the intensity of the infrared light beam emitted from the infrared light emitting diode 50 in the case in which the first and the second reference light emitting diodes 51e and 52e emit light beams at predetermined intensities. FIG. 3 is a schematic view of information stored on the memory in the light emission controller 42. Specifically, FIG. 3 is an exemplary table illustrating the relationship between the intensity of the first reference light beam received by the first light receiving device 51r and the intensity of the second reference light beam received by the second light receiving device 52r, and the intensity of the infrared light beam emitted from the infrared light emitting diode 50 stored on the light emission controller 42. Note that, the states of the front cover 11 in FIG. 3 are described for easy understanding, and the light emission controller 42 does not store the states of the front cover 11.

As illustrated in FIG. 3, in the state in which the front cover 11 is dry, the first and the second reference light beams are easily transmitted through the front cover 11. Thus, the first reference light beam received by the first light receiving device 51r and the second reference light beam received by the second light receiving device 52r are all light beams reflected off the front cover 11 by Fresnel reflection, and both of these light beams have extremely low intensities. In the case in which both of the signal from the first light receiving device 51r and the signal from the second light receiving device 52r have extremely low strengths, the light emission controller 42 stores information that the intensity of the infrared light beam emitted from the infrared light emitting diode 50 is zero.

In the state in which the front cover 11 is fogged, the second reference light beam is irregularly reflected off water attached to the front cover 11, and the second reference light beam received by the second light receiving device 52r has a moderate intensity. On the other hand, in this state, a part of the first reference light beam is absorbed by the water attached to the front cover 11. Thus, although a part of the first reference light beam is irregularly reflected similarly to the second reference light beam, the first reference light beam received by the first light receiving device 51r has a low intensity. In the case in which the signal from the first light receiving device 51r has a low strength and the signal from the second light receiving device 52r has a moderate strength, the light emission controller 42 stores information that the infrared light emitting diode 50 emits an infrared light beam having a low intensity. The intensity of the infrared light beam emitted from the infrared light emitting diode 50 being low means the intensity of the light beam to a degree that can remove fogging by absorbing the light beam to water attached to the front cover 11 to heat the water. Note that, the state in which the front cover 11 is fogged includes the case in which the inner side of the lamp chamber LR is fogged and the case in which the outer side of the lamp chamber LR is fogged. In both cases, the intensity of the first reference light beam received by the first light receiving device 51r is not so different in the tendency. Similarly, in both cases, the intensity of the second reference light beam received by the second light receiving device 52r is not so different in the tendency.

In the state in which the front cover 11 is wet, the second reference light beam is reflected off or transmitted through water attached to the front cover 11, depending on the water. Thus, the second reference light beam received by the second light receiving device 52r has the intensity lower than the intensity in the state in which the front cover 11 is fogged. The second reference light beam has a lower moderate intensity. On the other hand, a part of the first reference light beam is absorbed into water attached to the front cover 11. The amount of absorption is greater than that in the state in which the front cover 11 is fogged. Therefore, although a part of the first reference light beam is reflected off water attached to the front cover 11 or transmitted through the water similarly to the second reference light beam, the first reference light beam received by the first light receiving device 51r has an extremely low intensity. In the case in which the signal from the first light receiving device 51r has an extremely low strength and the signal from the second light receiving device 52r has a lower moderate strength, the light emission controller 42 stores information that the intensity of the infrared light beam emitted from the infrared light emitting diode 50 is moderate. The intensity of the infrared light beam emitted from the infrared light emitting diode 50 being moderate means the intensity of the light beam to a degree that can remove water wetting the front cover 11 by absorbing the light beam into water attached to the front cover 11 to heat the water.

In the state in which snow is attached to the front cover 11, most of the second reference light beam is reflected off the snow attached to the front cover 11. Thus, the second reference light beam received by the second light receiving device 52r has a high intensity. On the other hand, although a part of the first reference light beam is reflected off snow attached to the front cover 11, the other part is absorbed into the snow. Thus, the intensity of the first reference light beam received by the first light receiving device 51r is moderate. In the case in which the signal from the first light receiving device 51r has a moderate strength and the signal from the second light receiving device 52r has a high strength, the light emission controller 42 stores information that the infrared light beam emitted from the infrared light emitting diode 50 has a high intensity. The infrared light beam emitted from the infrared light emitting diode 50 having a high intensity means the intensity of the light beam to a degree that can melt snow attached to the front cover 11 by absorbing the light beam to snow attached to the front cover 11 to heat the snow.

<Operation of the Lamp 1, Such as Lighting>

Next, the operation of the lamp 1, such as lighting, will be described.

When an instruction signal to light the lamp 1 is externally inputted to the light emission controller 42, the light emission controller 42 causes the visible light emitting diode 40 to emit a light beam. The visible light beam emitted from the visible light emitting diode 40 is reflected off the reflector 33 as described above. A part of the visible light beam reflected off the reflector 33 is cut or reflected off the shade 32 so as to have a desired distribution of light, and the visible light beam is entered to the projection lens 20. The visible light beam emitted from the projection lens 20 is then emitted in a desired light distribution pattern through the front cover 11. At this time, the light emission controller 42 or the visible light emitting diode 40 is sometimes heated. However, as described above, the circulation of air by the cooling fan 47 cools the heat dissipating fins 46 to cool the light emission controller 42 or the visible light emitting diode 40.

The light emission controller 42 causes the first and the second reference light emitting diodes 51e and 52e to emit light beams at desired timing. For example, the light emission controller 42 causes the first and the second reference light emitting diodes 51e and 52e to emit light beams all the time, or causes the first and the second reference light emitting diodes 51e and 52e to emit light beams at regular time intervals. After the first and the second reference light emitting diodes 51e and 52e emit light beams, the first light receiving device 51r receives the first reference light beam, and the second light receiving device 52r receives the second reference light beam.

After the first light receiving device 51r receives the first reference light beam and the second light receiving device 52r receives the second reference light beam, the first and the second light receiving devices 51r and 52r output signals having strengths corresponding to the intensities of the received light beams, and the signals are inputted to the light emission controller 42.

Upon receiving the inputs, the light emission controller 42 makes reference to the memory, calculates the intensity of the infrared light beam emitted from the infrared light emitting diode 50 suitable for the strength of the signal from the first light receiving device 51r and the strength of the signal from the second light receiving device 52r, and controls the infrared light emitting diode to emit an infrared light beam having the calculated intensity. Thus, the infrared light emitting diode 50 emits the infrared light beam having the intensity controlled by the light emission controller 42. As described above, in the embodiment, the light beam emitted from the infrared light emitting diode 50 propagates through the optical path approximately the same as the optical path of the light beam emitted from the visible light emitting diode 40. Consequently, the light beam emitted from the infrared light emitting diode 50 is reflected off the reflector 33, applied to the front cover through the projection lens 20, and emitted from the front cover 11. That is, the front cover 11 can be understood as an applied body to which the infrared light beam emitted from the infrared light emitting diode 50 is applied.

As described above, the light beam emitted from the infrared light emitting diode 50 is an infrared light beam in a wavelength band including a wavelength of 1.4 μm or more, and has a high absorptivity into water. Thus, at least a part of the light beam is absorbed into water attached to the front cover 11. Note that, as described above, when the light beam emitted from the infrared light emitting diode 50 is in a wavelength band including a wavelength of 2.5 μm or more and 3.5 µm or less, the light beam can most efficiently heat the water attached to the front cover 11. Consequently, the water attached to the front cover 11 is heated by the energy of the light beam being absorbed. As described above, the intensity of the infrared light beam emitted from the infrared light emitting diode 50 is based on the intensities of the light beams received by the first and the second light receiving devices 51r and 52r, and the intensities of the light beams received by the first and the second light receiving devices 51r and 52r are the intensities corresponding to the state of the water attached to the front cover 11. Consequently, the infrared light emitting diode 50 can emit the infrared light beam having an appropriate intensity suitable for the state of the water attached to the front cover 11. Accordingly, the water attached to the front cover 11 is appropriately evaporated or melted suitable for the state.

As described above, in the lamp 1 according to the embodiment, water is directly heated by the infrared light beam emitted from the water heating device 5. Thus, the lamp 1 enables efficient heating of water, compared with the case in which the front cover 11, to which water is attached, is heated to heat attached water by thermal conduction from the front cover 11. Accordingly, the lamp 1 can efficiently evaporate or melt the water attached to the front cover 11.

Second Embodiment

Next, a second embodiment of the present invention will be described in detail with reference to FIGS. 4 and 5. Note that, components the same as or equivalent to the components of the first embodiment are designated the same reference signs, and the duplicate description is omitted, unless otherwise specified.

Figure 4:
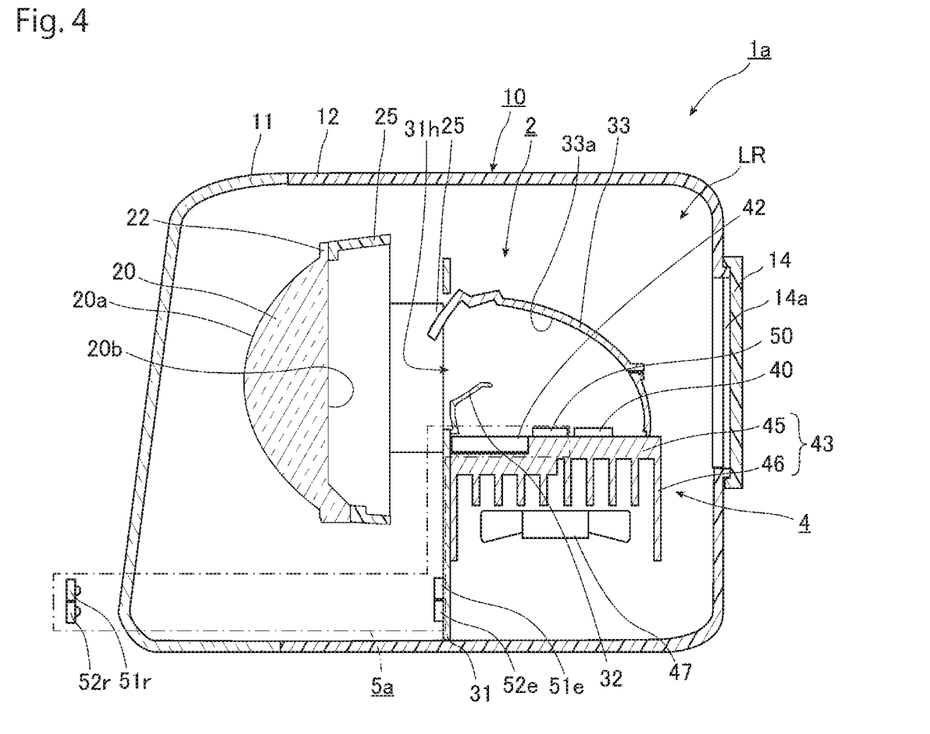
FIG. 4 is a schematic cross sectional view of a lamp according to a second embodiment of the present invention.

FIG. 4 is a view of a lamp according to the embodiment. As illustrated in FIG. 4, a lamp 1a according to the embodiment is a vehicle headlight similarly to the lamp 1 of the first embodiment, including a water heating device 5a instead of the water heating device 5 of the lamp 1. The water heating device 5a is different from the water heating device 5 of the first embodiment in that a first light receiving device 51r and a second light receiving device 52r are placed on the outside of a case 10. Specifically, in the embodiment, the first and the second light receiving devices 51r and 52r are placed opposed to the side where a first reference light emitting diode 51e and a second reference light emitting diode 52e are placed, based on a front cover 11. Thus, in the embodiment, the light receiving surfaces of the first and the second light receiving devices 51r and 52r are directed to the front cover 11 side. The first and the second light receiving devices 51r and 52r are mounted on a bumper or any other component of a vehicle using a mounting mechanism, for example, not shown. In this case, a configuration may be provided in which in the state in which the first and the second light receiving devices 51r and 52r emit no light beams, the first and the second light receiving devices 51r and 52r are placed behind a bumper.

The first light receiving device 51r receives a first reference light beam that is emitted from the first reference light emitting diode 51e and transmitted through the front cover 11. The second light receiving device 52r receives a second reference light beam that is emitted from the second reference light emitting diode 52e and transmitted through the front cover 11.

In the case of the embodiment, the intensities of the light beams received by the first and the second light receiving devices 51r and 52r are different from the intensities of the light beams received by the first and the second light receiving devices 51r and 52r in the first embodiment, depending on the state of water attached to the front cover 11. Thus, a memory in a light emission controller 42 stores the content different from the content in the first embodiment.

Figure 5:
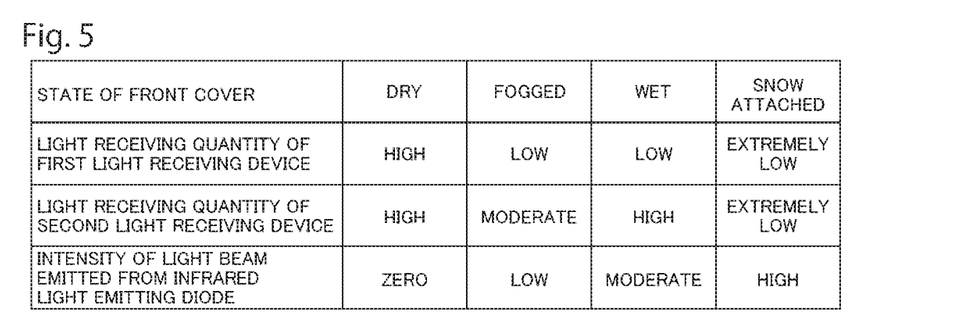
FIG. 5 is a view of information stored on a memory in a light emission controller in FIG. 4, similarly to FIG. 3.

FIG. 5 is a view of information stored on the memory in the light emission controller 42 of the embodiment similarly in FIG. 3. Specifically, FIG. 5 is an exemplary table illustrating the relationship between the intensity of the first reference light beam received by the first light receiving device 51r and the intensity of the second reference light beam received by the second light receiving device 52r, and the intensity of the infrared light beam emitted from an infrared light emitting diode 50 stored on the light emission controller 42.

As illustrated in FIG. 5, in the state in which the front cover 11 is dry, the first and the second reference light beams are easily transmitted through the front cover 11. Thus, both of the first reference light beam received by the first light receiving device 51r and the second reference light beam received by the second light receiving device 52r have a high intensity. In the case in which both of the signal from the first light receiving device 51r and the signal from the second light receiving device 52r have a high strength, the light emission controller 42 stores information that the intensity of the infrared light beam emitted from the infrared light emitting diode 50 is zero.

In the state in which the front cover 11 is fogged, the second reference light beam is irregularly reflected off water attached to the front cover 11 and transmitted through the front cover 11, or the second reference light beam is transmitted through the front cover 11 and then irregularly reflected. Thus, the second reference light beam received by the second light receiving device 52r has a moderate intensity. On the other hand, in this state, a part of the first reference light beam is absorbed into water attached to the front cover 11. Thus, although a part of the first reference light beam is transmitted through the front cover 11, similarly to the second reference light beam, the first reference light beam received by the first light receiving device 51r has a low intensity. In the case in which the signal from the first light receiving device 51r has a low strength and the signal from the second light receiving device 52r has a moderate strength, the light emission controller 42 stores information that the infrared light emitting diode 50 emits an infrared light beam having a low intensity.

In the state in which the front cover 11 is wet, a part of the second reference light beam is reflected off water attached to the front cover 11, and the other part is transmitted through the water. In this case, since the light beam transmitted through the water is not irregularly reflected, the second reference light beam received by the second light receiving device 52r has a higher intensity than the intensity in the state in which the front cover 11 is fogged, and has a high intensity. On the other hand, a part of the first reference light beam is absorbed into water attached to the front cover 11, and the amount of absorption is greater than that in the state in which the front cover 11 is fogged, but the light beam transmitted through the front cover 11 and the water is not irregularly reflected. Thus, the first reference light beam received by the first light receiving device 51r is not so different from that in the state in which the front cover 11 is fogged, and has a low intensity. In the case in which the signal from the first light receiving device 51r has a low strength and the signal from the second light receiving device 52r has a high strength, the light emission controller 42 stores information that the intensity of the infrared light beam emitted from the infrared light emitting diode 50 is moderate.

In the state in which snow is attached to the front cover 11, both of the first and the second reference light beams are not easily transmitted through the snow, and both of the first reference light beam received by the first light receiving device 51r and the second reference light beam received by the second light receiving device 52r have an extremely low intensity. In the case in which both of the signal from the first light receiving device 51r and the signal from the second light receiving device 52r have an extremely low strength, the light emission controller 42 stores information that the infrared light beam emitted from the infrared light emitting diode 50 has a high intensity.

Also in the lamp 1a according to the embodiment, the light emission controller 42 causes the first and the second reference light emitting diodes 51e and 52e to emit light beams at desired timing. After the first and the second reference light emitting diodes 51e and 52e emit light beams, the first light receiving device 51r receives the first reference light beam, and the second light receiving device 52r receives the second reference light beam. After the first light receiving device 51r receives the first reference light beam and the second light receiving device 52r receives the second reference light beam, the signals having strengths corresponding to the intensities of the light beams received from the first and the second light receiving devices 51r and 52r are inputted to the light emission controller 42.

Thus, the light emission controller 42 makes reference to the memory, calculates the intensity of the infrared light beam emitted from the infrared light emitting diode 50 illustrated in FIG. 5 suitable for the strength of the signal from the first light receiving device 51r and the strength of the signal from the second light receiving device 52r, and controls the infrared light emitting diode 50 to emit an infrared light beam having the calculated intensity. Consequently, the infrared light emitting diode 50 emits the infrared light beam having the intensity controlled by the light emission controller 42.

Third Embodiment

Next, a third embodiment of the present invention will be described in detail with reference to FIG. 6. Note that, components the same as or equivalent to the components of the first embodiment are designated as the same reference signs, and the duplicate description is omitted, unless otherwise specified.

Figure 6:
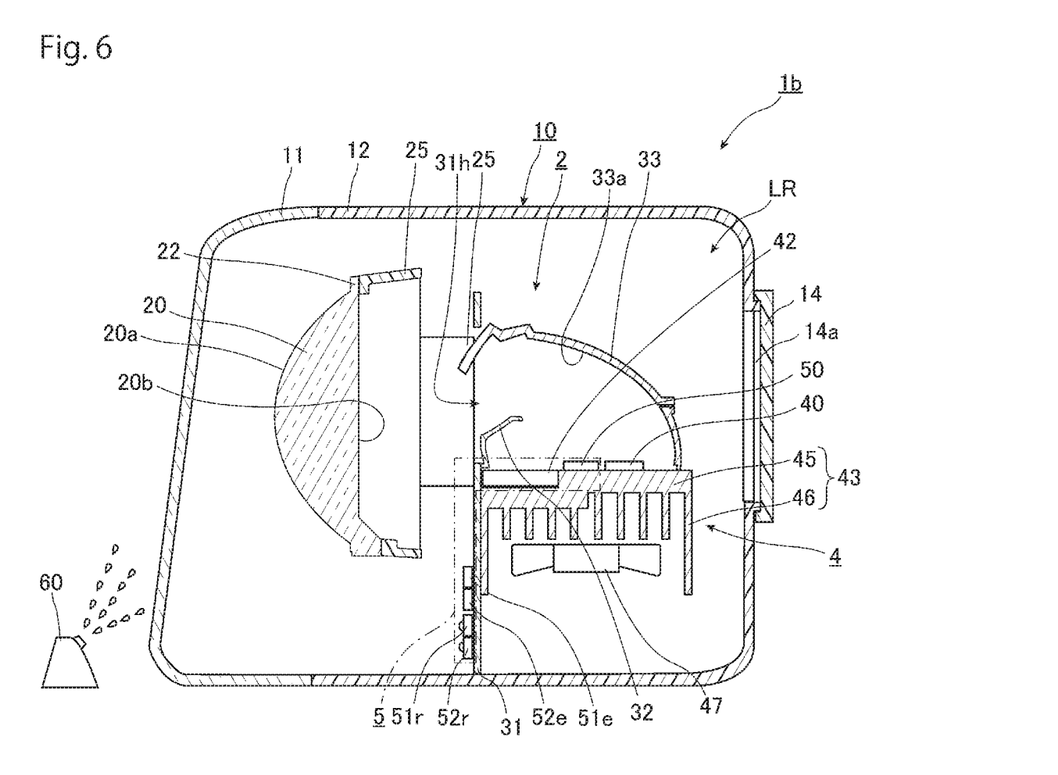
FIG. 6 is a schematic cross sectional view of a lamp according to a third embodiment of the present invention.

As illustrated in FIG. 6, a lamp 1b according to the embodiment is different from the lamp 1 of the first embodiment in that the lamp 1b includes a spray unit 60 configured to spray water from the outside of a case 10 to a front cover 11. Note that, the spray unit 60 is mounted on a bumper or any other component of a vehicle using a mounting mechanism, for example, not shown. In the state in which the spray unit 60 sprays no water, a configuration may be provided in which the spray unit 60 is placed behind a bumper.

In accordance with the lamp 1b according to the embodiment, in the case in which the outer side of the front cover 11 is fogged, or snow is attached to the outer side of the front cover 11, the spraying of water from the spray unit 60 can remove the fogging or the attached snow. In the spraying, water from the spray unit 60 might be attached to the front cover 11. However, even in this case, the infrared light beam emitted from the infrared light emitting diode 50 enables efficient heating of the attached water and efficient removal of the water, similarly to the lamp 1 of the first embodiment.

Fourth Embodiment

Next, a fourth embodiment of the present invention will be described in detail with reference to FIG. 7. Note that, components the same as or equivalent to the components of the first embodiment are designated the same reference signs, and the duplicate description is omitted, unless otherwise specified.

Figure 7:
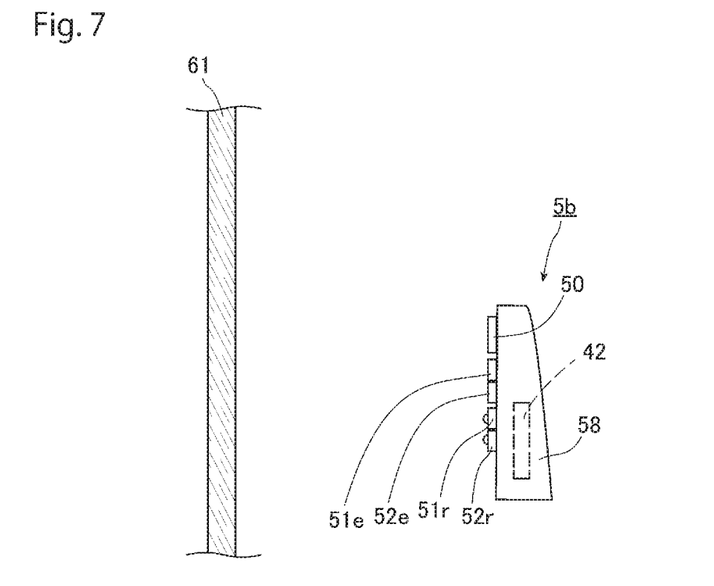
FIG. 7 is a view of a water heating device according to a fourth embodiment of the present invention.

FIG. 7 is a view of a water heating device 5b of the embodiment. As illustrated in FIG. 7, the water heating device 5b of the embodiment is different from the water heating device 5 of the first embodiment in that the water heating device 5b is not placed in the lamp chamber LR of the lamp 1, and is used as a separate component.

In the embodiment, on a main body 58 formed of a box, an infrared light emitting diode 50, a first reference light emitting diode 51e, a second reference light emitting diode 52e, a first light receiving device 51r, and a second light receiving device 52r are placed. In the embodiment, the light emission surfaces of the infrared light emitting diode 50 and the first and the second reference light emitting diodes 51e and 52e and the light receiving surfaces of the first and the second light receiving devices 51r and 52r are directed in the same directions.

In the main body 58, a light emission controller 42 is placed. The light emission controller 42 according to the embodiment is different from the light emission controller 42 of the first embodiment in that the water heating device 5b has no visible light emitting diode because the water heating device 5b emits no visible light beams unlike the lamp 1 of the first embodiment and the light emission controller 42 of the embodiment does not control the light emission of the visible light emitting diode.

In FIG. 7, the light emission surfaces of the infrared light emitting diode 50 and the first and the second reference light emitting diodes 51e and 52e and the light receiving surfaces of the first and the second light receiving devices 51r and 52r are directed to a windowpane 61. The windowpane 61 has the light reflection property and the light transmission property similarly to the front cover 11 of the first embodiment, for example, and the windowpane 61 is hydrophilic similarly to the front cover 11.

The water heating device 5b of the embodiment is operated similarly to the water heating device 5 of the first embodiment. Thus, in the state in which the windowpane 61 is dry, the infrared light emitting diode 50 emits no light beam, and the infrared light emitting diode 50 emits infrared light beams having different intensities suitable for the state in which the windowpane 61 is fogged, the state in which the windowpane 61 is wet, and the state in which snow is attached to the windowpane 61. That is, in the embodiment, the windowpane 61 is an applied body to which the infrared light beam is applied from the infrared light emitting diode 50.

Note that, the infrared light emitting diode 50 preferably applies the infrared light beam to the lower area below the center of the windowpane 61. In the case in which water in air is attached to the windowpane 61 or in the case in which snow is attached to the windowpane 61, the water tends to be attached to the lower area of the windowpane 61. Thus, as described above, the application of the infrared light beam to the lower area of the windowpane 61 enables efficient heating of water. In FIG. 7, one infrared light emitting diode 50 is provided. However, the arrangement of a plurality of the infrared light emitting diodes 50 enables heating of water attached to the windowpane 61 in a wider area.

The water heating device 5b of the embodiment can efficiently evaporate or melt water attached to the windowpane 61. The heating of water attached to the automobile windshield is enabled by placing the water heating device 5b on or inside the dashboard of a vehicle, for example.

Figure 8:
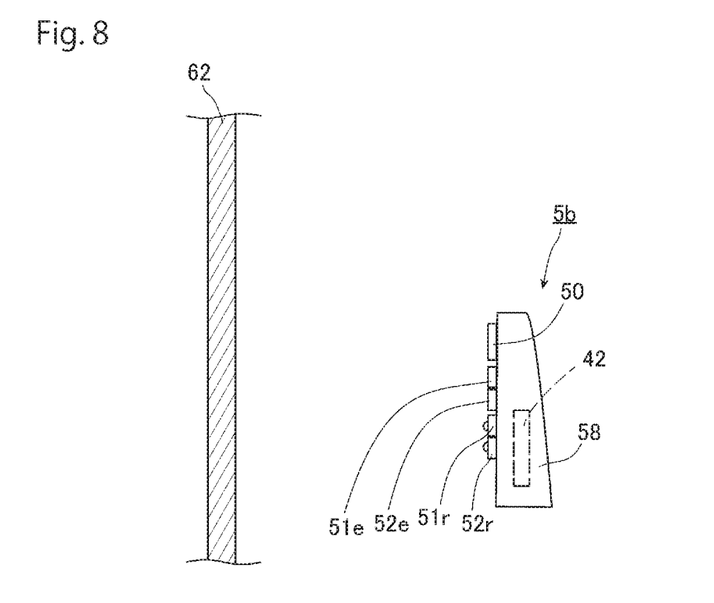
FIG. 8 is a view of another use form of the water heating device in FIG. 7.

FIG. 8 is a view of another use form of the water heating device 5b. The use form illustrated in FIG. 8 is different from the use form, in which the applied body is the windowpane 61, in that a body to which the infrared light beam from the water heating device 5b is applied is a mirror 62 to reflect off light beams emitted from the infrared light emitting diode 50 and the first and the second reference light emitting diodes 51e and 52e. Thus, light beams are applied from the side where water is attached to the mirror 62.

In accordance with such a use form, even though a part of the infrared light beam applied from the infrared light emitting diode 50 toward the mirror 62 is transmitted through water attached to the mirror 62, the transmitted infrared light beam is reflected off the mirror 62. Since the reflected infrared light beam is again passed through the water attached to the mirror 62, the infrared light beam emitted from the infrared light emitting diode 50 is absorbed into the water before and after reflected off the mirror 62. Accordingly, more efficient absorption of the infrared light beam into water is enabled.

As described above, the water heating device and the lamp according to the present invention are described using the first to the fourth embodiments as non-limiting examples.

For example, in the foregoing embodiments, the water heating devices 5, 5a, and 5b include the first and the second reference light emitting diodes 51e and 52e and the first and the second light receiving devices 51r and 52r. The light emission controller 42 controls the infrared light emitting diode 50 on the basis of the signals outputted from the first and the second light receiving devices 51r and 52r. However, the infrared light emitting diode 50 may be controlled by other methods. For example, the infrared light emitting diode 50 may emit an infrared light beam having a constant intensity with no provision of the first and the second reference light emitting diodes 51e and 52e and the first and the second light receiving devices 51r and 52r on the water heating device.

A configuration may be provided in which the water heating device includes a thermometer instead of the first and the second reference light emitting diodes 51e and 52e and the first and the second light receiving devices 51r and 52r, and the infrared light emitting diode 50 emits an infrared light beam in the case in which a predetermined temperature or less is observed. In this case, the intensity of the infrared light beam emitted from the infrared light emitting diode 50 may be adjusted based on the temperature indicated by the thermometer. For example, since water is more prone to be attached to the applied body as the temperature is lower, the infrared light beam emitted from the infrared light emitting diode 50 may have a higher intensity as the temperature indicated by the thermometer is lower. A configuration may be provided in which the water heating device includes a hygrometer instead of the first and the second reference light emitting diodes 51e and 52e and the first and the second light receiving devices 51r and 52r, and the infrared light emitting diode 50 emits an infrared light beam in the case in which the hygrometer indicates a predetermined humidity or more on the premise that water is easily attached to the applied body when humidity is high.

A configuration may be provided in which the water heating device obtains weather information from information communication devices, such as car navigation systems, portable communication devices, and personal computers, and the water heating device causes the infrared light emitting diode 50 to emit an infrared light beam on the basis of the signals from the information communication devices in the case in which the weather information is a predetermined piece of information.

In the forging embodiments, the front cover 11 or the windowpane 61 that is an applied body transmits the infrared light beam emitted from the infrared light emitting diode 50, and the mirror 62 that is an applied body reflects off the infrared light beam emitted from the infrared light emitting diode 50. However, the present invention is not limited to these examples. The applied body may absorb the infrared light beam emitted from the infrared light emitting diode 50.

In the forging embodiments, light beams are emitted from the first and the second reference light emitting diodes 51e and 52e, the light beams are reflected off or transmitted through the front cover 11 and the windowpane 61 that are applied bodies, or reflected off the mirror 62 that is an applied body, and then the light beams are received by the first and the second light receiving devices 51r and 52r. However, the applied body does not necessarily have to be placed on the optical path from the first reference light emitting diode 51e to the first light receiving device 51r, and the optical path from the second reference light emitting diode 52e to the second light receiving device 52r, for example. In this case, the intensity of the first reference light beam received by the first light receiving device 51r is changed depending on moisture (humidity) in air on the optical path from the first reference light emitting diode 51e to the first light receiving device 51r and the optical path from the second reference light emitting diode 52e to the second light receiving device 52r. That is, since the first reference light beam is more absorbed into moisture in air as humidity is higher, the intensity of the first reference light beam received by the first light receiving device 51r is decreased. Therefore, a configuration may be provided in which on the premise that water is easily attached to the applied body in the case in which humidity is high, also in this case, the light emission controller 42 controls the intensity of the infrared light beam emitted from the infrared light emitting diode 50, based on the signals outputted from the first and the second light receiving devices 51r and 52r.

In the first to the third embodiments, the infrared light emitting diode 50 is placed side by side with the visible light emitting diode 40. However, the present invention is not limited to this. For example, the infrared light emitting diode 50 may be integrated with the visible light emitting diode 40. Alternatively, the infrared light emitting diode 50 may be placed regardless of the position to place the visible light emitting diode 40. In this case, the infrared light emitting diode 50 preferably applies the infrared light beam to the lower area below the center of the front cover 11. In the case in which water is attached to the front cover 11 or in the case in which snow is attached to the front cover 11, the water tends to be attached to the lower area of the front cover 11. Consequently, the application of the light beam to the lower area of the front cover 11 enables efficient heating of water.

In the first to the third embodiments, an example in which the lamp is a vehicle headlight is described. However, the lamp according to the present invention is not limited to this. In the case of lamps used for vehicles, the lamp according to the present invention may be used for identification lamps, such as tail lamps, or used for interior lighting. An example in which the lamp unit 2 is a PES optical system is shown. However, the lamp unit 2 may be a parabolic optical system or a monofocal optical system. The lamp according to the present invention may be lamps used except for vehicles.

In the forging embodiments, the front cover 11, the windowpane 61, and the mirror 62 are hydrophilic. However, the surfaces of these applied bodies do not necessarily have to be hydrophilic.

As described above, the present invention provides a water heating device that enables efficient heating of water attached to things and a lamp using the same, which can be used in the fields of vehicle lamps and the fields of any other devices.

REFERENCE SIGNS LIST 1, 1a, 1b . . . lamp
2 . . . lamp unit
4 . . . light source unit
5, 5a, 5b . . . water heating device
10 . . . case
11 . . . front cover (applied body)
12 . . . lamp housing
20 . . . projection lens
25 . . . lens holder
31 . . . base plate
32 . . . shade
33 . . . reflector
40 . . . visible light emitting diode
42 . . . light emission controller
46 . . . heat dissipating fins
47 . . . cooling fan
50 . . . infrared light emitting diode
51e . . . first reference light emitting diode
51r . . . first light receiving device
52e . . . second reference light emitting diode
52r . . . second light receiving device
60 . . . spray unit
61 . . . windowpane (applied body)
62 . . . mirror (applied body)

The invention claimed is:

1. A lamp comprising:
a light source configured to emit a visible light beam;
a cover configured to transmit the visible light beam emitted from the light source;
a projection lens;
a water heating device, including an infrared light emitting diode configured to emit an infrared light beam in a wavelength band including a wavelength of 1.4 µm or more, and
a reference light source to emit a reference infrared-light beam having a wavelength different from the wavelength of the infrared light beam emitted from the water heating device;
wherein, with application of the infrared light beam toward the cover, at least a part of the infrared light beam is configured to be absorbed into and heat water attached to the cover,
wherein the visible light beam and the infrared light beam pass through the projection lens and the cover; and
wherein the visible light beam emitted from the light source propagates through approximately the same optical path as the optical path of the infrared light beam emitted from the infrared light emitting diode, and the visible light beam, and the infrared light beam pass through the projection lens and the cover;
wherein the reference infrared-light beam emitted from the reference light source does not pass through the projection lens.

2. The lamp according to claim 1, further comprising:
a spray unit configured to spray water to an outgoing surface of the cover to emit the visible light beam.

3. The lamp according to claim 1, wherein
the lamp is a vehicle lamp configured to apply the visible light beam toward an outside of a vehicle.

4. The lamp according to claim 3, wherein
the infrared light beam has a wavelength band including a wavelength of 2.5 µm or more and 3.5 µm or less.

5. The lamp according to claim 1, wherein
the applied body transmits the infrared light beam.

6. The lamp according to claim 1, wherein
the applied body reflects the infrared light beam.

7. The lamp according to claim 1, wherein:
the reference light source comprises a first reference light emitting diode configured to emit a first reference light beam as the reference infrared-light beam in a wavelength band including a wavelength of 1.4 µm or more;
the lamp further comprising:
a first light receiving device configured to receive the first reference light beam;
a second reference light emitting diode configured to emit a second reference light beam in a wavelength band having an absorptivity into water lower than an absorptivity of the first reference light beam into water;
a second light receiving device configured to receive the second reference light beam; and
a controller, wherein
the controller adjusts an intensity of the infrared light beam emitted from the infrared light emitting diode based on an output of the first light receiving device and an output of the second light receiving device.

8. The lamp according to claim 7, wherein
the applied body transmits the infrared light beam, the first reference light beam, and the second reference light beam,
the first light receiving device receives the first reference light beam transmitted through the applied body, and
the second light receiving device receives the second reference light beam transmitted through the applied body.

9. The lamp according to claim 7, wherein
the applied body reflects the infrared light beam, the first reference light beam, and the second reference light beam,
the first light receiving device receives the first reference light beam reflected off the applied body, and
the second light receiving device receives the second reference light beam reflected off the applied body.

10. The lamp according to claim 1, wherein
the infrared light beam is applied to a lower area below a center of the applied body.

11. The lamp according to claim 1, wherein
the applied body includes a main body and a surface layer, and
the surface layer is more hydrophilic than the main body.

* * * * *